(12) United States Patent
Smith, Jr. et al.

(10) Patent No.: US 6,460,559 B2
(45) Date of Patent: Oct. 8, 2002

(54) VALVE HAVING CERAMIC COMPONENTS AND ASSOCIATED FABRICATION METHOD

(75) Inventors: James Edwin Smith, Jr., Huntsville, AL (US); George O. Ellis, Bowling Green, KY (US); David Todd Ellis, Bowling Green, KY (US)

(73) Assignee: University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 09/775,080

(22) Filed: Feb. 1, 2001

(65) Prior Publication Data

US 2001/0038084 A1 Nov. 8, 2001

Related U.S. Application Data

(63) Continuation-in-part of application No. 09/738,383, filed on Dec. 15, 2000.
(60) Provisional application No. 60/170,807, filed on Dec. 15, 1999.

(51) Int. Cl.[7] .................................................. F16K 5/20
(52) U.S. Cl. ..................... 137/15.22; 251/174; 251/337; 251/368; 29/2.25; 29/890.122
(58) Field of Search ................................. 251/174, 902, 251/337, 368; 137/15.22; 29/888.44, 890.122, 2.1, 2.25

(56) References Cited

U.S. PATENT DOCUMENTS

| | | | |
|---|---|---|---|
| 3,063,461 A | * 11/1962 | Rudolph | ................. 251/902 X |
| 3,518,742 A | 7/1970 | Merrill et al. | |
| RE26,998 E | * 12/1970 | Brown | ................. 137/15.22 X |
| 3,601,287 A | * 8/1971 | Schwartzman | ........... 222/146.2 |
| 3,648,729 A | * 3/1972 | Balkany | ................. 137/533.13 |
| 3,985,150 A | 10/1976 | Kindersley | |
| 4,253,992 A | 3/1981 | Soejima et al. | |
| 4,372,531 A | 2/1983 | Rollins et al. | |
| 4,735,638 A | 4/1988 | Ciliberti et al. | |
| 4,922,949 A | 5/1990 | Mizukusa et al. | |
| 4,936,546 A | 6/1990 | Berchem | |
| 4,945,945 A | 8/1990 | Schmid | |
| 5,040,566 A | 8/1991 | Orlandi | |
| 5,041,315 A | 8/1991 | Searle et al. | |
| 5,043,117 A | 8/1991 | Adachi et al. | |
| 5,052,349 A | 10/1991 | Buelna | |
| 5,052,363 A | 10/1991 | Stiles | |
| 5,055,435 A | 10/1991 | Hamanaka et al. | |
| 5,106,106 A | 4/1992 | Bruckner et al. | |
| 5,139,229 A | * 8/1992 | Beasley | ................... 137/15.22 |
| 5,234,166 A | * 8/1993 | Foster et al. | ................ 239/333 |
| 5,275,191 A | * 1/1994 | Bernard | ................... 137/15.22 |

(List continued on next page.)

FOREIGN PATENT DOCUMENTS

| | | |
|---|---|---|
| GB | 2 205 631 A | 12/1988 |
| GB | 2 215 437 A | 9/1989 |
| GB | 2 258 290 A | 2/1993 |

*Primary Examiner*—Lesley D. Morris
*Assistant Examiner*—Eric Keasel
(74) *Attorney, Agent, or Firm*—Alston & Bird LLP (57) ABSTRACT

A valve for controlling the flow of a fluid comprises a housing, a flow-control element disposed within the housing, at least one seat operably engaging the flow-control element, and a biasing device for urging the seat and the flow-control element relative toward each other. In some embodiments, the valve also includes an actuating device operably engaging the flow-control element. The flow-control element, the seat, and the biasing device are comprised of a refractory material, and at least the biasing device is formed of a toughened refractory or ceramic material that is fully annealed so that porosity in the material is substantially eliminated and such that the material is substantially homogenous. In some embodiments, the seat, the flow-control element, the biasing device, and/or other components may be advantageously fabricated together as a unitary structure. An associated fabrication method is also provided.

2 Claims, 5 Drawing Sheets

U.S. PATENT DOCUMENTS

| | | |
|---|---|---|
| 5,297,580 A | 3/1994 | Thurman |
| 5,312,804 A | 5/1994 | Petitbon et al. |
| 5,353,832 A | 10/1994 | Berchem |
| 5,503,180 A | 4/1996 | Nimberger |
| 5,566,923 A | 10/1996 | Ennis et al. |
| 5,707,041 A | 1/1998 | Bovee et al. |
| 5,810,041 A | 9/1998 | Garofalo |
| 5,814,262 A | 9/1998 | Ketcham et al. |
| 5,829,735 A | 11/1998 | Ikeda |
| 5,935,533 A | 8/1999 | Kleefisch et al. |
| 5,937,892 A | 8/1999 | Meisner et al. |

* cited by examiner

VALVE HAVING CERAMIC COMPONENTS AND ASSOCIATED FABRICATION METHOD

CROSS-REFERENCE TO RELATED APPLICATIONS

This application is a continuation-in-part of currently pending U.S. patent application Ser. No. 09/738,383, filed Dec. 15, 2000, which claims the benefit of the filing date of U.S. Provisional Patent Application Serial No. 60/170,807 filed Dec. 15, 1999.

FIELD OF THE INVENTION

The invention relates to valves used in controlling the flow of fluids in a fluidic system and, more particularly, to a valve and components thereof suitable for use in high temperature, corrosive, abrasive, and other hostile environments.

BACKGROUND OF THE INVENTION

Valves are commonly employed as flow control devices in all types of fluidic systems. These valves may have many different configurations, depending on the particular application, such as a ball valve, a gate valve, a globe valve, a slide valve, a check valve and the like. Such valves typically comprise a housing having a fluid inlet and a fluid outlet, a flow-control element disposed within the housing between the inlet and the outlet, and one or more seals engaging the flow-control element to prevent the fluid from flowing between the housing and the flow-control element and/or out of the housing. The valves often also include one or more biasing devices, typically metal coil springs, for urging the flow-control element and seals toward each other. In addition, valves that are used for providing on-off and/or flow-rate regulation functions generally also include an actuating device for moving the flow-control element between an open position, where flow of the fluid between the inlet and the outlet is permitted, and a closed position in which the fluid is not able to flow between the inlet and the outlet. The actuating device can be manually operated or can be coupled with an electrical, hydraulic, or pneumatic actuator that operates the actuating device in response to signals from a controller connected with the actuator.

In valves as described above, the various components of the valve are generally comprised of materials appropriate for the particular application. For example, many components for a low-pressure cold water valve can be comprised of a polymer material, whereas a valve used at higher pressures and temperatures may be comprised predominantly of metallic components. However, common valves generally become unsuitable as the temperature and the hostility of the environment increases. For instance, where corrosive and/or abrasive-containing fluids are being handled, commonplace valves may be easily damaged unless special measures are taken in the design of the valve and/or the remainder of the fluidic system to protect the valves. Without costly measures to allow the use of commonplace valves in hostile environments, a serious safety hazard or reliability problem may be created. As an example of such measures, high-temperature fluidic processes may require hot process fluids to be cooled before being pumped or piped through a valve to a subsequent location where the fluid may again have to be restored to the proper operating temperature for the process, thereby reducing the efficiency and raising the cost of such an operation. Thus, there exists a need for a valve capable of operating safely, reliably, and economically in high temperature or other hostile environments, such as in fluidic systems where corrosive and/or abrasive-containing fluids are present.

Still further concerns exist with common valves in emergency situations where the temperatures of the fluids to which the valves are exposed are not controllable. For example, in the event of a fire at a petrochemical refinery, excessive temperatures may cause common valves to fail, thereby allowing storage tanks to deleteriously feed the fire with catastrophic results. At excessively high temperatures, seals internal to the valve may fail, the seat and/or the flow-control element may warp, and/or any springs present within the valve may lose their spring constants and thereby allow separation of the components biased by the spring. Thus, the endeavor to develop a valve suitable for use at excessively high temperatures has led to the proposal that ceramic materials could be used for valve fabrication. See, for example, U.S. Pat. No. 4,372,531 to Rollins et al.

Ceramics are generally recognized as a class of refractory materials suitable for use in high temperature applications and in corrosive or abrasive environments. However, most ceramics are typically deficient in their ability to withstand tensile stresses without failure. Therefore, where components are fabricated from ceramic materials, these components are configured and utilized such that they are exposed mainly to compressive stresses and little or no tensile stresses. However, many components of a valve may experience significant tensile stresses caused, at least in part, by shear stresses imparted by the fluid and possibly the configuration and utilization of the component. Thus, where ceramic has been utilized in the fabrication of valve components, additional measures must often be taken to assure that the valve functions as intended without the ceramic components failing. Generally, these additional measures comprise supplemental components fabricated of a material more appropriate for withstanding tensile stresses, but typically not as able to withstand excessively high temperatures as the ceramic material. For instance, a Teflon seal may be placed between the flow-control element and the seat. This results in a valve where the critical and/or fluid-contacting components are not entirely able to withstand excessively high temperature or other hostile environments to which the valve may be exposed. Thus, there exists a further need for a valve capable of withstanding high temperature or other hostile environments, wherein the critical and/or fluid-contacting components are fabricated of refractory materials such as a ceramic.

Thus, a continued need exists for a practical valve capable of withstanding excessively high temperatures or other hostile environments, wherein the valve is relatively simple to produce, reliable, and cost effective.

SUMMARY OF THE INVENTION

The above and other needs are met by the invention which, in one embodiment, provides a flow-controlling device or valve for controlling the flow of a fluid and capable of withstanding extreme temperatures of over 600° C. and also capable of withstanding abrasive and corrosive environments. In accordance with the invention, all of the biasing and sealing components in the valve, including the flow-control element, the seat sealingly engaging the flow-control element, and the spring for biasing the seat into sealing contact with the flow-control element, are prepared from highly stable refractory and/or toughened ceramic materials that are capable of withstanding abrasives, corrosives, and extreme temperatures. Preferably, no elements made of polymer materials such as rubber or rubberlike polymers, plastic materials such as TEFLON, or the like, are included in the valve. The valve components are simple in design and can be retrofitted into existing standard valve housings, including, but not limited to, poppet and ball valves. These valves can withstand process fluids at over 500° C., at over 640° C., and at red-hot conditions of 1000° C. or more over extended periods of time comparable to prior designs that have current practical limits of about 200 to 400° C.

Certain refractory and/or toughened ceramics materials, commonly referred to as advanced ceramics, exhibit useful resistance to tensile stress when the material is heat treated in a certain manner. More particularly, a yttria-stabilized zirconia or other comparable ceramic material that is fully annealed so that porosity in the material is minimized and so that the material is substantially homogenous, is capable of substantial elongation and compression without failure. This flexible ceramic allows the fabrication of fluid-contacting, sealing, or other valve members from the same heat- and wear-resistant materials.

The valve in accordance with one preferred embodiment of the invention comprises a housing having a flow passage formed therethrough, a flow-control element disposed within the flow passage of the housing, at least one seat, and a biasing device urging the seat and the flow-control element relatively toward each other. The housing passage has an inlet adapted to receive the fluid and an outlet through which the fluid is discharged. The flow-control element is disposed in the passage between the inlet and the outlet and acts in conjunction with the seat to control the flow of the fluid therethrough. Each of the flow-control element, the seat, and the biasing device are comprised of refractory and/or toughened materials including, for example, an advanced ceramic. More specifically, the seat, the flow-control element, the biasing device, or other components may be advantageously fabricated of a flexible ceramic material. In some embodiments, the seat and the biasing device are prepared as a unitary structure from a toughened ceramic, including, for example, yttria-stabilized zirconia and others. The flow-control element can be prepared from a harder ceramic, if desired. The valve in some embodiments of the invention further comprises an actuating device operably engaging the flow-control element for moving the flow-control element between closed and open positions, and for varying the degree of flow restriction by the flow-control element in some cases. If desired, the actuating device can also be prepared from the same types of materials as the flow-controlling element, the seat, and the biasing device.

In an alternative embodiment, the valve may further comprise a shield operably engaging the seat and adapted to channel the fluid through the valve passage such that the shield prevents fluid flowing through the valve from contacting the biasing device. This embodiment can be useful if it is desired to preclude abrasive particles in the fluid from contacting the biasing device. However, it normally should not be necessary to isolate a ceramic spring from abrasives that may be contained in a process fluid. Of course, if the valve were operated at lower temperatures such that a spring made from a more-conventional material such as steel were employed, then it may be advantageous to shield the spring from abrasives. If desired, the seat and the shield can be integrally fabricated from a unitary piece of ceramic material; furthermore, the seat, the biasing device, and the shield can be integrally fabricated from a unitary piece of ceramic material. In some embodiments of the invention such as relief or safety valves that open in response to fluid pressure differential across the flow-control element, the flow-control element and the biasing device can be integrally fabricated from a unitary piece of ceramic material.

In one embodiment of the invention, the valve comprises a ball valve for controlling the flow of a fluid. Generally, the ball valve comprises a housing, a valve ball disposed within the housing, at least two seats operably engaging the valve ball, a biasing device operably engaging each seat, optionally a shield operably engaging each seat, and a valve stem operably engaging the valve ball. The housing defines an inlet adapted to receive the fluid and an outlet adapted to dispense the fluid, and the valve ball is disposed between the inlet and the outlet and defines a bore capable of establishing communication between the inlet and the outlet. The seat is adapted to prevent the fluid from flowing between the housing and the valve ball, while the biasing device operably engages the seat and urges the seat into sealing engagement with the valve ball. The shield, when present, extends from the valve ball to at least one of the inlet and the outlet and is adapted to channel the fluid therebetween. The valve stem operably engages the valve ball and is capable of actuating the valve ball between an open position in which the fluid is capable of flowing between the inlet and the outlet through the bore in the valve ball and a closed position in which the fluid is not capable of flowing between the inlet and the outlet through the bore in the valve ball. The valve ball, the seat, the biasing device, and the shield, if included, are comprised of a refractory material such as ceramic, and at least the biasing device is formed of a toughened refractory material that is flexible. In one particularly advantageous embodiment, the seat, the biasing device, and the shield, if present, are an integral structure fabricated from a unitary piece of a ceramic material such as, for example, yttria-stabilized zirconia.

In another embodiment of the invention, the valve comprises a fluid-operated valve in which the flow-control element is not actuated from outside the valve but rather is moved between open and closed positions by fluid pressure differential across the flow-control element. Examples of such valves include non-return or check valves, relief valves, and safety valves. The valve generally comprises a housing having a passage extending therethrough from an inlet to an outlet of the housing, a seat disposed in the housing, a flow-control element such as a ball or poppet disposed in the passage of the housing such that the flow-control element is movable between an open position spaced from the seat such that fluid can flow through the valve between the seat and the flow-control element and a closed position engaging the seat so as to prevent fluid flow through the valve, and at least one biasing device for urging the flow-control element relatively toward the seat. In accordance with the invention, the seat, flow-control element, and each biasing device are all formed from a refractory material and at least the biasing device is formed of a toughened refractory material. In one embodiment, the flow-control element comprises a poppet and can be integrally fabricated with a biasing device from a single unitary piece of toughened ceramic material. Additionally or alternatively, the seat and a biasing device can be integrally fabricated from a single unitary piece of toughened ceramic material.

The invention also encompasses a method of fabricating a sealing device for interacting with a flow-control element of a valve for controlling the flow of a fluid. In accordance with the invention, a bore is formed in a cylinder of a refractory material such that the bore defines an axis and is adapted to cooperate with the flow-control element to control the flow of a fluid through the bore. In some instances, the sealing device may be fabricated starting with a tubular member having appropriate inner and outer diameters, such that the bore is already present. A seating surface is then formed in the cylinder generally perpendicular to the axis of the bore. A cylindrical channel is then formed in the cylinder such that the channel extends into the cylinder concentrically with the bore and thereby forms a cylindrical spring blank outward of the channel and a cylindrical spring shield inward of the channel such that the inner surface of the spring shield defines the bore. The spring blank is then machined along a generally helical or spiral path so as to fabricate a biasing device in the form of a helical spring. In this manner, the sealing device is formed as an integral structure from a unitary piece of a refractory material, such as a flexible ceramic, where the biasing device is capable of biasing the seat into sealing engagement with the flow-control element and the spring shield channels the fluid flow such that contact of the fluid with the biasing device and/or the housing is avoided.

Still another advantageous aspect of the invention comprises a device for sealing an actuator that is operably connected to a flow-control element disposed within a main housing for controlling the flow of a fluid. Generally, the device comprises an actuator housing adapted to engage the main housing so as to surround the actuator, a compliant packing adapted to be disposed about the actuator, an end cap operably engaging the actuator housing, and a biasing device disposed within the actuator housing intermediate the end cap and the packing. The actuator housing has a proximal end adjacent to the flow-control element and an opposing threaded distal end. The packing is disposed about the actuator at the proximal end of the actuator housing adjacent to the flow-control element to form a seal between the actuator and the actuator housing. The end cap is secured to the threaded end of the actuator housing and is generally adapted to allow the actuator to pass therethrough. The biasing device is configured such that a substantially uniform compressive force is applied to the packing about the actuator when the biasing device interacts with the end cap and the packing. The packing is thereby compressed between the actuator housing and the actuator to form a seal therebetween. The packing can be comprised of, for example, a graphite-impregnated foil material or a graphite-impregnated ceramic fiber. The actuator and biasing device can be prepared from ceramic materials of the same type as is used in the other components, if desired.

Thus, the invention provides fluid-contacting and other components of a valve that are sufficiently flexible and generally heat- and wear-resistant and can withstand significant applied tensile stresses. Certain components may be fabricated as unitary structures, thereby reducing the number of components required for the valve assembly. Embodiments of the invention therefore provide a valve capable of operating in high temperature and other hostile environments in a relatively safe and reliable manner, while the characteristics of the ceramic material facilitate cost-effective fabrication techniques. It will be recognized, therefore, that the invention facilitates the achievement of a number of distinct advantages over prior art valves used in high-temperature or other hostile environments.

BRIEF DESCRIPTION OF THE DRAWINGS

Some of the advantages of the invention having been stated, others will appear as the description proceeds, when considered in conjunction with the accompanying drawings, which are not necessarily drawn to scale, in which.

DETAILED DESCRIPTION OF PREFERRED EMBODIMENTS

The invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
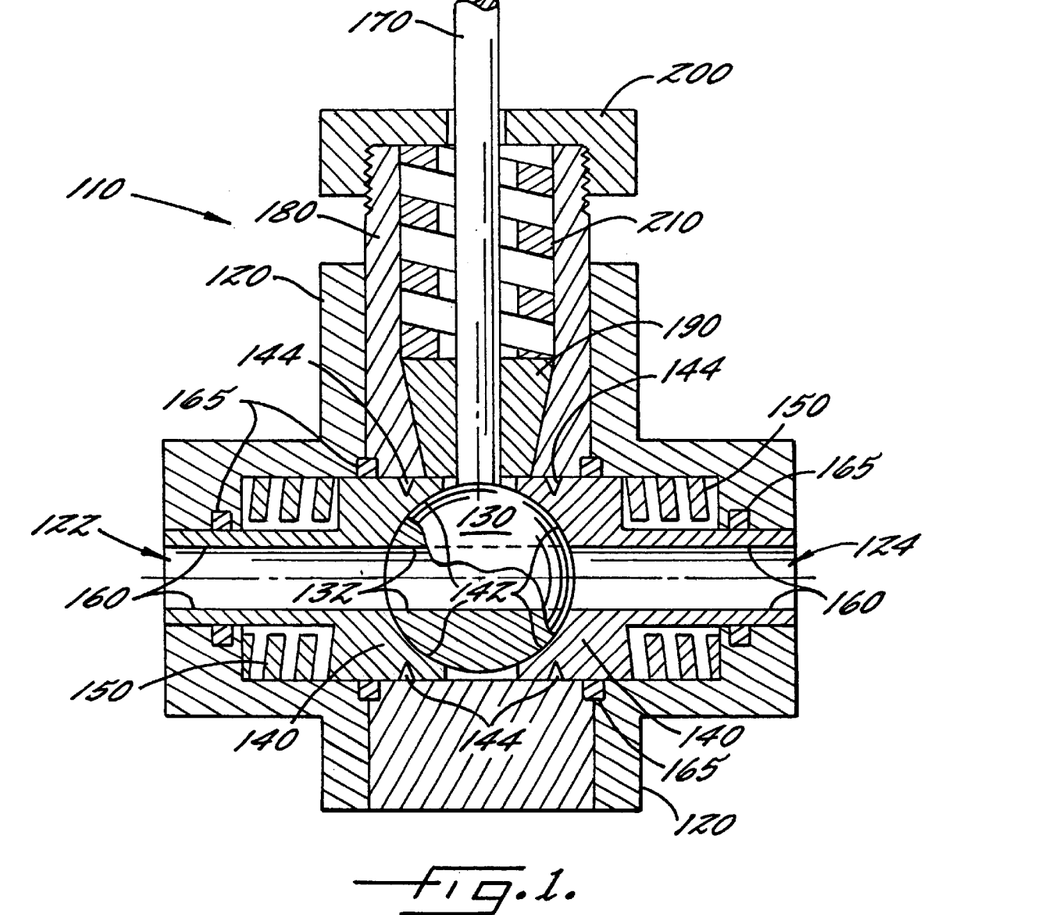
FIG. 1 is a cross-sectional view of a ball valve having ceramic components according to one embodiment of the invention.

FIG. 1 discloses a valve according to one embodiment of the invention, more particularly a ball valve, indicated generally by the numeral 110. The ball valve 110 generally comprises a valve housing 120, a valve ball 130, a valve seat 140, a biasing device 150 for biasing the seat 140, a spring shield 160, a valve stem 170, a valve stem housing 180, valve stem packing 190, an end cap 200, and a packing spring 210.

The valve housing 120 of the ball valve 110 defines a passage therethrough having an inlet 122 adapted to receive a fluid and an outlet 124 adapted to dispense the fluid therefrom. The valve ball 130 is disposed within the passage of the valve housing 120 between the inlet 122 and the outlet 124. The valve ball 130 defines a bore 132 therethrough. Flow through the bore 132 in the ball can occur when the valve ball 130 is oriented in an open position having the bore 132 generally aligned with the passage in the housing 120. The valve ball 130 is rotatable within the housing 120 such that the orientation of the bore 132 may be changed between the open position and a closed position in which the bore 132 is no longer in communication with the inlet 122 and the outlet 124 and the fluid is not able to flow. This general mechanism governs the operation of the illustrated ball valve 110. The valve ball 130 may be comprised of many different ceramics such as, for example, high purity alumina, stabilized zirconia, silicon nitride, mullite, or the like.

Operably engaging the valve ball 130 is at least one valve seat 140. In the particular embodiment of the valve illustrated in FIG. 1, there are two separate valve seats 140, one to form a seal with the valve ball 130 on the inlet side thereof and the other to form a seal with the valve ball 130 on the outlet side thereof. The valve seats 140 form a seal between the valve ball 130 and the housing 120 such that fluid entering the inlet 122 does not flow out of the housing 120 or around the valve ball 130 between the valve ball 130 and the housing 120. In order to facilitate a sealing engagement between the seat 140 and the valve ball 130, a biasing device 150 such as, for example, a helical spring, is provided to exert a compressive force on each seat 140 to urge the seat 140 into sealing engagement with the valve ball 130.

In some instances, a spring shield 160 is further provided for preventing fluid from contacting one or both of the biasing devices 150. The spring shield 160 extends between the seat 140 and the inlet 122 and/or the outlet 124 radially inwardly of the biasing device 150 such that the spring shield 160 forms a channel for directing the fluid flow between the valve ball 130 and the inlet 122 and/or outlet 124. In one particularly advantageous embodiment, the valve seat 140, the biasing device 150, and the spring shield 160 form an integral structure fabricated from a unitary piece of a refractory material such as, for example, a ceramic. Although the spring shield 160 may not be necessary for the practice of the invention, it can be advantageous where the fluid flow being controlled by the valve 110 contains particulate matter that could cause damage to the biasing device 150. Since the various valve components are typically exposed to the high temperatures and/or other hostile environments created by the fluid flowing therethrough, the valve seat 140, the biasing device 150, and the spring shield 160 may be comprised of, for example, magnesium-stabilized zirconia, yttria-stabilized zirconia, some high purity aluminas, silicon nitride, or the like. In general, the components as described herein may be selectively comprised of a ceramic according to the desired operability of the valve 110. For instance, a valve 110 for handling an abrasive fluid may have acceptable performance characteristics where only the valve ball 130 is comprised of a ceramic such that the less-expensive and readily replaceable seats 140 would tend to wear before the more-critical and relatively expensive valve ball 130. Thus, the materials from which, for instance, the valve ball 130, the valve seats 140, the biasing devices 150, and the spring shield 160 are formed may be selected to provide the desired wear or other performance characteristics. In some cases, for example, the valve ball 130 may be comprised of a ceramic different from the ceramic from which the seat 140 is comprised.

Besides the advantages provided by the use of ceramic materials in the fabrication of valve components, the processing of the ceramic material itself has been found to be particularly advantageous. Ceramic materials such as, for example, some high-purity aluminas, magnesium-stabilized zirconia, yttria-stabilized zirconia, silicon nitride and the like have been found to withstand tensile stresses when fully annealed to minimize porosity and to produce a substantially homogeneous material. Such an annealing process may comprise, for example, gradually reducing the post-formation temperature at a controlled rate over an extended period of time. In one particular example, yttria-stabilized zirconia was found to exhibit desirable material properties when the material was reduced from a formation temperature of about 2200° C. to room temperature over a time period of about three days in an approximately linear manner. While particular examples are described herein, it is understood that many different ceramics may exhibit similar ability to withstand tensile stresses when annealed in an appropriate manner. The parameters of the annealing process also may vary greatly and yet still produce a substantially homogeneous ceramic with minimal porosity. Further, other factors such as, for example, the thickness of the material may also affect the mechanical properties exhibited by components eventually fabricated from the fully annealed ceramic. Thus, it is understood that embodiments of the invention may include any ceramic that is fully annealed to obtain substantial homogeneity and minimal porosity in accordance with the spirit and scope of the invention.

Where necessary, additional seals 165 may be established between the valve housing 120 and the valve seats 140 and/or the spring shields 160. Since the seals 165 are isolated from the fluid by the valve seat 140 and/or the spring shields 160, the seals 165 may be comprised of a flexible, heat-resistant material such as, for example, a graphite-impregnated foil, such as GRAFOIL, or a graphite-impregnated ceramic fiber material. As shown, the seals 165 seal outer surfaces of the valve seat 140 and the spring shield 160 to the valve housing 120 and help to prevent foreign materials from coming into contact with the biasing device 150.

With the configuration of a ball valve 110 as shown, the valve ball 130 typically has an actuating device 170 operably engaged therewith for moving the valve ball 130 between the open position and the closed position. The actuating device 170 may comprise, for example, a valve stem extending from the valve ball 130, generally perpendicular to the bore 132. The attachment of the valve stem 170 to the valve ball 130 requires provisions for sealing about the valve stem 170, and these provisions must take into account that the valve stem 170 is required to rotate about its longitudinal axis in order to provide the necessary actuation of the valve ball 130. Therefore, a ball valve 110 generally includes a valve stem housing 180 operably connected to the valve housing 120 and extending therefrom. The valve stem housing 180 may be welded to, threaded into, or otherwise securely attached to the valve housing 120 such that it surrounds the valve stem 170. Since the area about the valve stem adjacent to the valve ball 130 may be in communication with the fluid flowing through the valve 110 caused by, for example, leakage between the valve ball 130 and the valve seat 140, provisions must also be made for the components within the valve stem housing 180 to be resistant to the same high temperatures and/or the factors producing the hostile environment that are experienced by the valve ball 130. With ball valves in general, a valve stem packing 190 is typically inserted into the valve stem housing 180 about the valve stem 170 and then compressed such that the packing 190 forms a seal between the valve stem housing 180 and the valve stem 170. However, most packings 190 will tend to wear and/or become increasingly compressed as the valve 110 is used. Thus, according to one embodiment of the invention, the valve stem housing 180 houses a packing 190 disposed about the valve stem 170 adjacent to the valve ball 130, wherein the packing 190 may be comprised of, for example, a graphite-impregnated foil material or a graphite-impregnated ceramic fiber. Sealing the end of the valve stem housing 180 is an end cap 200, also called a packing nut, that is operably connected to the end of the valve stem housing 180 by a threaded connection. The end cap 200 permits the valve stem 170 to pass therethrough. In order to maintain the compressive force on the packing 190 to provide optimal sealing between the valve stem 170 and the valve stem housing 180, a packing spring 210 is disposed between the end cap 200 and the packing 190 within the valve stem housing 180. The ends of the packing spring 210 may be configured such that the spring 210 engages both the end cap 200 and the packing 190, with substantially planar faces, such that a uniform compressive force is maintained on the packing 190 about the valve stem 170. In a particularly advantageous embodiment of the invention, at least the packing spring 210, and possibly the valve stem 170 as well, are comprised of a refractory material such as, for example, a ceramic that is fully annealed to minimize porosity as herein described.

Figure 2:
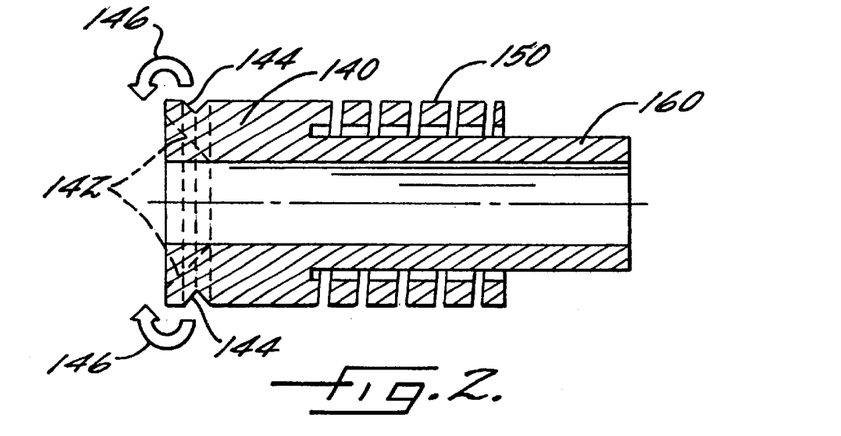
FIG. 2 is a cross-sectional view of a valve seat having an integral spring and spring shield in accordance with one embodiment of the invention.

FIGS. 1 and 2 show embodiments of a valve seat 140 having an integral biasing device 150 and spring shield 160. As shown, the seating surface 142 may have different configurations in order to engage a valve ball 130 in different manners or in order to engage different configurations of a valve ball 130. The seating surface 142 may have a conical contour (i.e., having an infinite radius of curvature in the axial direction), a spherical contour (i.e., having a constant, finite radius of curvature in the axial direction), or a contour having a varying radius of curvature in the axial direction. The latter contour may be advantageous in some respects. More specifically, it can be advantageous to shape the seating surface 142 such that, in a relaxed condition of the seat, the radius of curvature in the axial direction, as seen for instance in the axial cross-sectional views shown in the drawings, is relatively larger toward the inner radius of the seat 140 and is relatively smaller at the outer radius of the seat corresponding to a flexible portion formed by a groove 144 that is cut into the outer periphery of the seat 140. More particularly, the groove 144 is formed about the perimeter of the valve seat 140 proximate to the seating surface 142 so as to provide a reduced-thickness section of the valve seat 140. This reduced-thickness section allows the portion of the valve seat between the seating surface 142 and the groove 144 to be flexible relative to the remainder of the valve seat 140. When the valve ball 130 is biased against the seat 140, the flexible portion of the seat 140 is deformed to conform closely to the contour of the ball. Accordingly, the valve seat 140 has a resilient seating surface that can accommodate slight mismatches between the valve ball and the seating surface contours so as to maintain a reliable fluid seal therebetween.

Figure 4A:
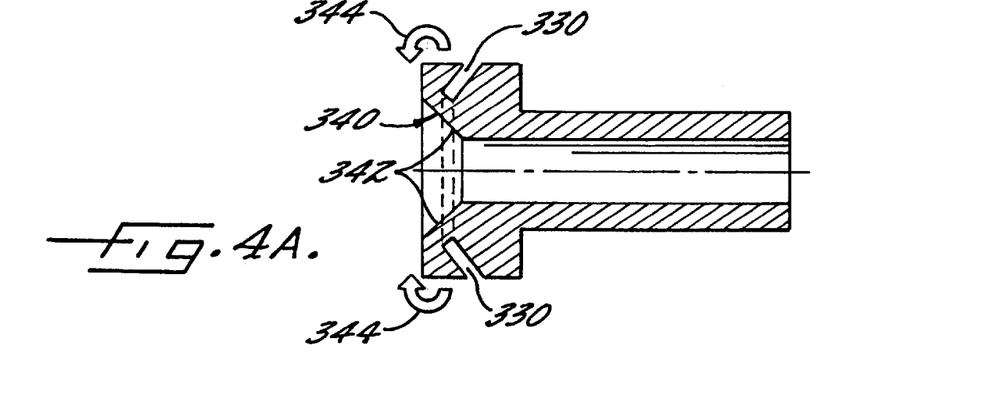
FIGS. 4A and 4B are cross-sectional views of valve seats according to alternate embodiments of the invention.
Figure 4B:
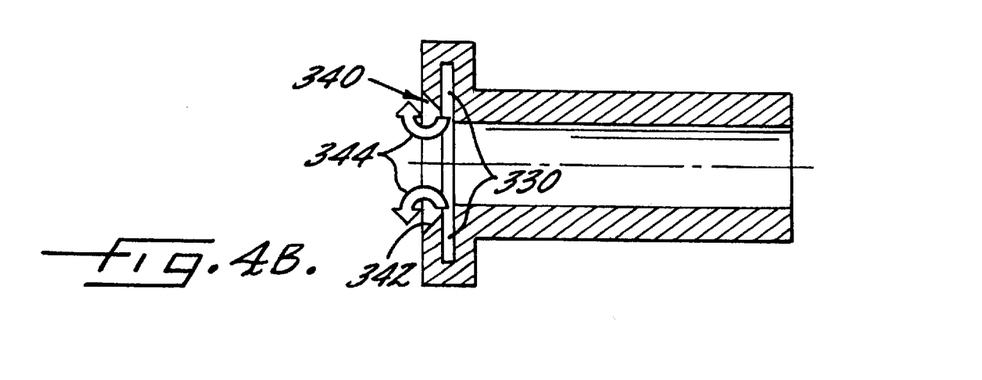

Various forms and shapes of valve seats 140 are further shown in FIGS. 4A and 4B (shown with the biasing device omitted). It is understood that the configurations of the valve seats 140 having a groove 144 for forming a resiliently flexible seat as presented herein are merely examples of possible configurations for valve seats 140 consistent with the spirit and scope of the invention.

By forming the biasing device 150 and the spring shield 160 integrally with the valve seat 140, these components may be formed of the same heterogeneous material without joints therebetween that could result in fluid leaks and that may require additional sealing provisions at the interfaces thereof. Note that various combinations of the seat 140, the biasing device 150, and the spring shield 160 may be fabricated as integral structures according to the invention and the requirements of a particular application thereof. For example, the seat 140 and the spring shield 160 may be fabricated from a ceramic material as an integral structure while a metallic material is used to fabricate the biasing device 150. In general, it is advantageous to employ fewer components and unitary construction of selected combinations of components so as to reduce the fabrication costs of the valve 110 and promote a more reliable operational fluidic system.

FIG. 3 presents a sequence of a cross-sectional views depicting a method of fabricating a sealing device for interacting with a flow-control element of a valve according to one embodiment of the invention. As shown in FIG. 3A, a bore 320 is first formed in a cylinder 310 of a refractory material such as, for example, a ceramic. The bore 320 defines an axis that is generally concentric with the axis of the cylinder 310. A groove 330 is then formed about the perimeter of the cylinder 310 such that the groove 330 is concentric with the bore 320, as shown in FIG. 3B. A valve seat 340 having a seating surface 342 is then formed in the cylinder 310 adjacent to the groove 330, such that the seating surface 342 is generally perpendicular to the axis of the bore 320 as shown in FIGS. 3C and 3D. Generally, the groove 330 is disposed proximate the seating surface 342 so as to cause the portion of the seating surface 342 about the perimeter of the cylinder 310 to be flexible as indicated by the directional arrows 344.

Figure 3A:
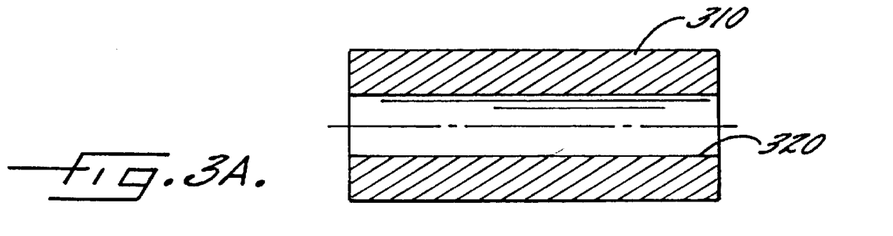
FIGS. 3A–3G present a sequence of cross-sectional views depicting a method of fabricating a valve seat having an integral spring and spring shield in accordance with one embodiment of the invention.
Figure 3B:
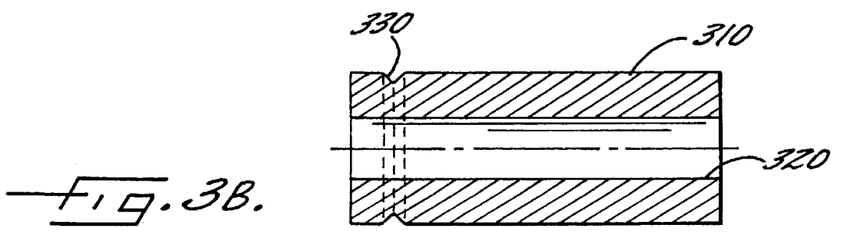
Figure 3C:
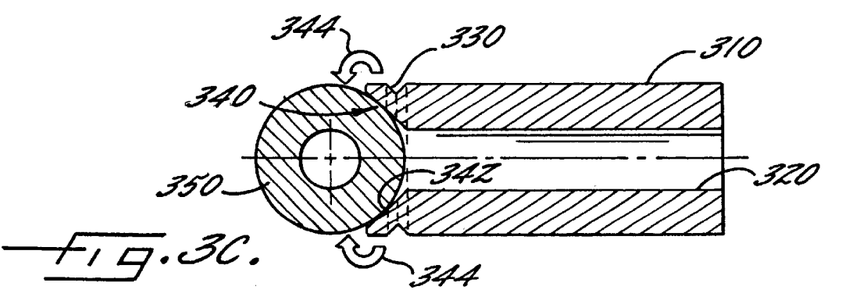
Figure 3D:
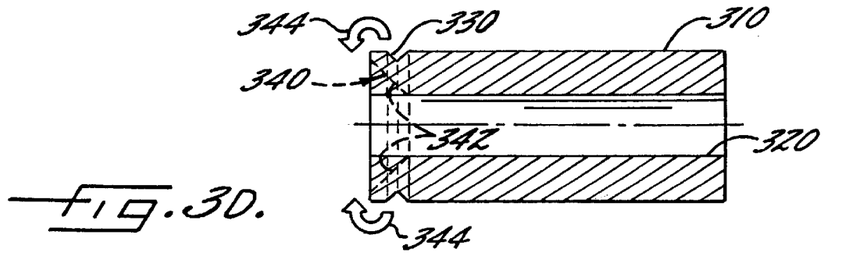

The seating surface 342 will generally be formed by grinding the cylinder 310 with an appropriately shaped grinding tool (not shown). The force exerted on the material by the grinding tool will tend to deflect the flexible portion of the cylinder between the seating surface and the groove 330, such that after grinding the flexible portion will spring back. This phenomenon tends to cause the seating surface 342 to have a slightly different contour in a relaxed state than it has when loaded by the grinding tool. This effect can be used to advantage to form a seating surface that has a flexible portion that is first contacted by the valve ball when the ball is driven by fluid pressure against the seating surface; this flexible portion can absorb the impact of the valve ball so as to lessen the chance of damage being done to the valve seat from the impact. As an example, the grinding tool may have a spherical contour similar to that of the valve ball. The force of the grinding tool against the seat will cause the radially outer portion of the seat near the groove 330 to be deformed outwardly, and the contour of the seat when thus loaded and deformed by the tool will be spherical. However, when the tool is removed, the flexible portion at the outer radius will spring back; the result will be that the radius of curvature of the seating surface 342 at the outer radius will be less than at the inner radius of the seating surface. Accordingly, the radially outer part of the seating surface will be the first part to be contacted by the valve ball 350 when the ball is driven against the seating surface. This flexible portion of the seating surface can thus cushion the impact of the valve ball.

As further shown in FIGS. 3C and 3D, the valve seat 340 may be formed in different configurations to interact with the valve ball 350 in different manners depending on the characteristics of the fluid flowing through the valve or to correspond to different configurations of the valve ball 350. As shown in FIGS. 4A and 4B, the placement and configuration of the groove 330 in relation to the valve seat 340 may vary considerably depending upon the characteristics of the seating surface 342 required in the particular application.

Figure 3E:
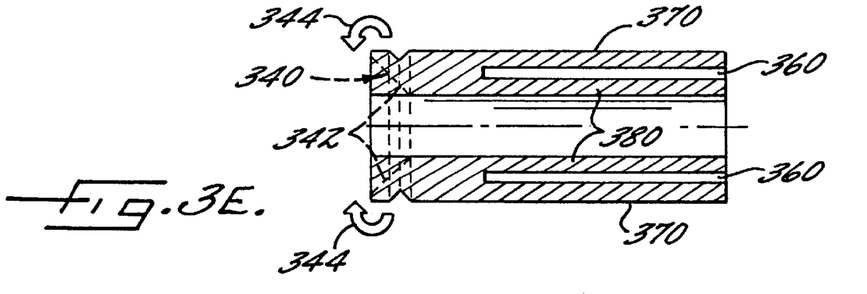
Figures 3F, 3G:
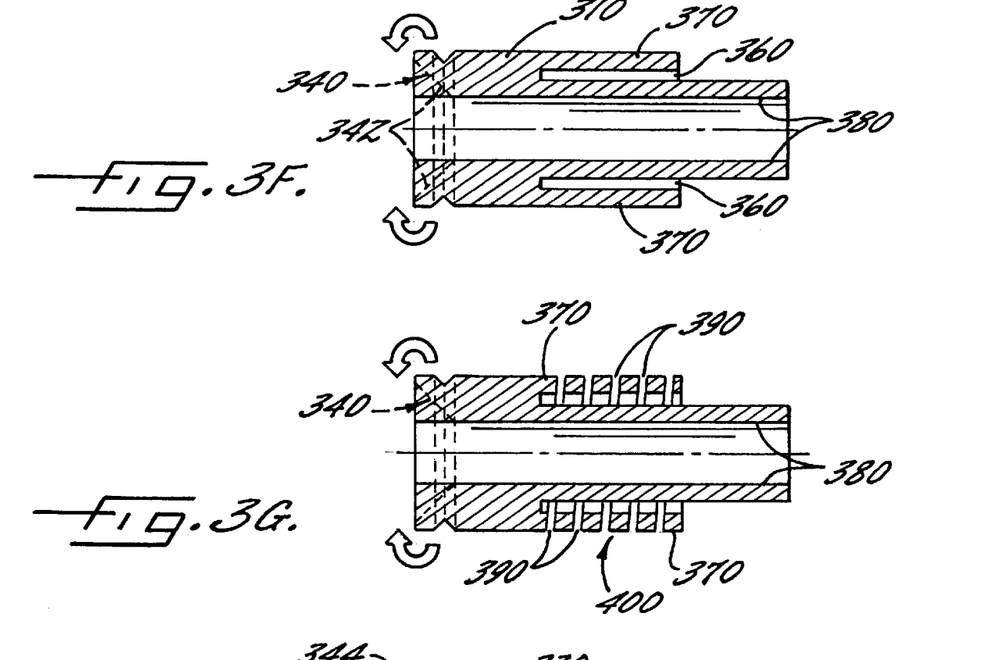

Following the formation of the valve seat 340, a channel 360 is formed in the cylinder opposing the seating surface 342 as shown in FIG. 3E. This results in the formation of a spring blank 370 radially outward of the channel 360 and a spring shield 380 radially inward of the channel 360. As shown in FIG. 3F, the spring blank 370 may be reduced in length, in some instances, to compensate for the thickness of the valve housing into which the cylinder 310 is to be inserted. As shown in FIG. 3G, a spiral groove 390 is then formed in the spring blank 370 so as to fabricate a biasing device 400 such as, for example, a helical spring. In this manner, a valve seat 340 is formed integrally with a biasing device 400 and a spring shield 380.

The biasing device 400 can be formed in various configurations having different pitches or spiral angles of the helical, and having various numbers of turns. Furthermore, the helical can have a pitch that is non-constant along the longitudinal direction of the helical spring. In one advantageous embodiment (not shown), the number of turns per inch of length of the helical spring can be relatively higher adjacent the seat 340 and can decrease with increasing distance away from the seat 340. For instance, the spring can have about 20 turns per inch adjacent the seat 340, decreasing to about 14 turns per inch with increasing distance away from the seat.

Figure 5:
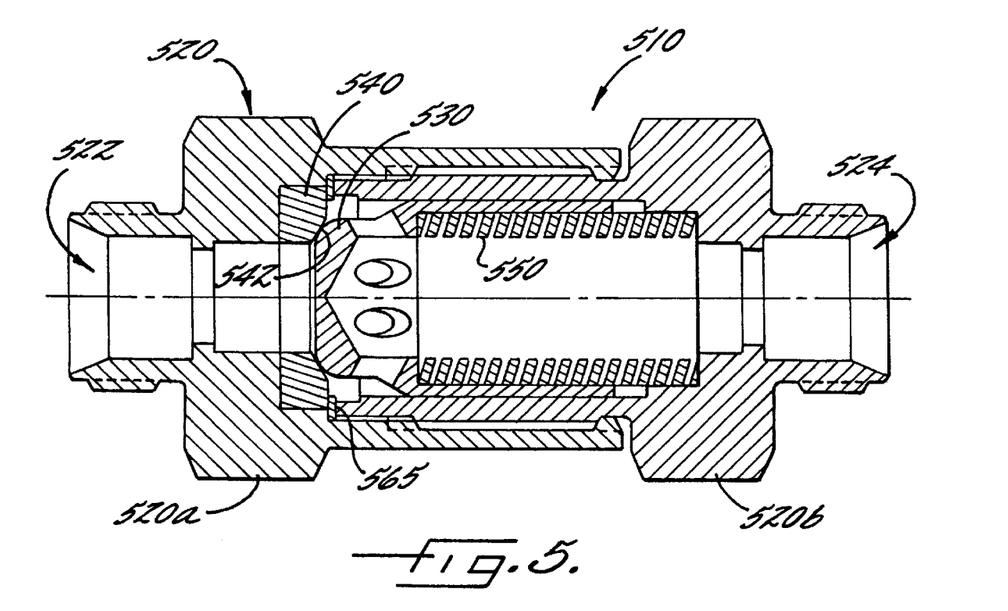
FIG. 5 is a cross-sectional view of a poppet-type check valve in accordance with a further embodiment of the invention.

FIG. 5 depicts an alternative embodiment of the invention in the form of a check valve 510. The check valve includes a housing 520 having a passage extending therethrough from an inlet 522 to an outlet 524 thereof. A valve member 530 is disposed in the passage so as to be slidable relative to the housing in the longitudinal direction along which the passage extends. The valve member 530 interacts with a seat 540 mounted in the housing so as to regulate flow through the valve 510. More particularly, the valve member 530 is urged by a spring 550 into sealing engagement with a seating surface 542 of the seat 540. The seating surface 542 and the corresponding surface of the valve member 530 that seats against the seating surface are preferably configured complementarily to each other, for instance, as spherical surfaces having the same radius of curvature. Flow in the direction from the outlet 524 to the inlet 522 is prevented by the sealing engagement between the valve member 530 and the seat 540. Fluid pressure differential across the valve member 530 in this flow situation urges the valve member 530 against the seat 540, and thus acts in the same direction as the force of the spring 550. However, when fluid flows in the opposite direction, from the inlet 522 to the outlet 524, the fluid pressure differential across the valve member 530 acts against the force of the spring; accordingly, if the pressure differential becomes large enough to overcome the spring force, the valve member 530 will be urged away from the seat 540, thus allowing fluid to flow. The "cracking pressure" that is required to open the valve in this manner can be varied by varying the spring constant for the spring 550.

In accordance with the present invention, at least the seat 540 and the spring 550 are formed of a refractory material, and at least the spring 550 is formed of a toughened refractory material that is capable of significant elongation and compression without failure, as previously described. Additionally, the valve member 530 can also be formed of a refractory material. The seat 540 advantageously is firmly fixed in the housing 520, such as by adhesively bonding the seat to abutting surfaces of the housing.

The housing 520 is formed of a first portion 520*a* in which the seat 540 is mounted, and a second portion 520*b* that houses the valve member 530 and spring 550. The first and second portions of the housing comprise tubular members, the second portion being received into the first portion and connected thereto by a threaded connection. The valve 510 preferably includes a seal 565 between the second portion 520*b* of the housing and the seat 540, which is compressed therebetween when the second portion is screwed into the first portion. The seal 565 advantageously comprises a non-polymer-based material such as a graphite-impregnated foil (GRAFOIL). Although the valve member 530 illustrated in FIG. 5 is a poppet, it will be understood that various other configurations of valve members can be used, including balls and other types.

Other variations of the check or non-return valve are also possible. For instance, the seat 540 can be urged by another spring (not shown) toward the valve member 530; such spring can be formed of a toughened refractory material separately from the seat 540, or the spring can be integrally formed with the seat in a manner similar to that described above in connection with FIGS. 3A through 3G. It is also possible in a similar manner to form a spring integrally with the valve member 530.

A poppet check valve having a stainless steel poppet and housing and a ceramic seat and ceramic spring substantially as shown in FIG. 5 was manufactured and tested over a range of temperatures to determine the behavior of the cracking pressure of the valve as a function of temperature. The cracking pressure test was performed by immersing the valve in a heated fluidized sand bath with a gas supply line connected to the inlet side of the valve and an outlet line connected to the outlet side of the valve. The supply line was connected to a pressurized gas (nitrogen) supply via a metering valve and pressure gauge. A toggle valve to a vent was connected between the pressure gauge and the valve being tested. The opposite end of the outlet line from the valve outlet was submerged in a water bath so that even a slight amount of gas flow from the outlet line was readily detectable by bubbling from the line. The valve in the fluidized sand bath was heated to each of a series of temperatures (100° C., 200° C., 300° C., 400° C., 500° C., and 600° C.); a type K thermocouple attached to the valve was used to monitor the temperature. At each temperature, cracking pressure was measured 12 times by the following procedure. The metering valve was slightly opened such that pressure in the inlet line to the valve gradually began to build up. When the first bubble from the outlet line was seen in the water bath, the pressure indicated on the pressure gauge was recorded as the cracking pressure. The pressure was allowed to continue to build up to a maximum. This maximum pressure was recorded, and then the toggle valve to vent was opened to vent the supply line. The toggle valve was then closed again to take another cracking pressure measurement. For comparison purposes, the room temperature cracking pressure of the valve was also measured to be 2.4 psig.

Figure 7:
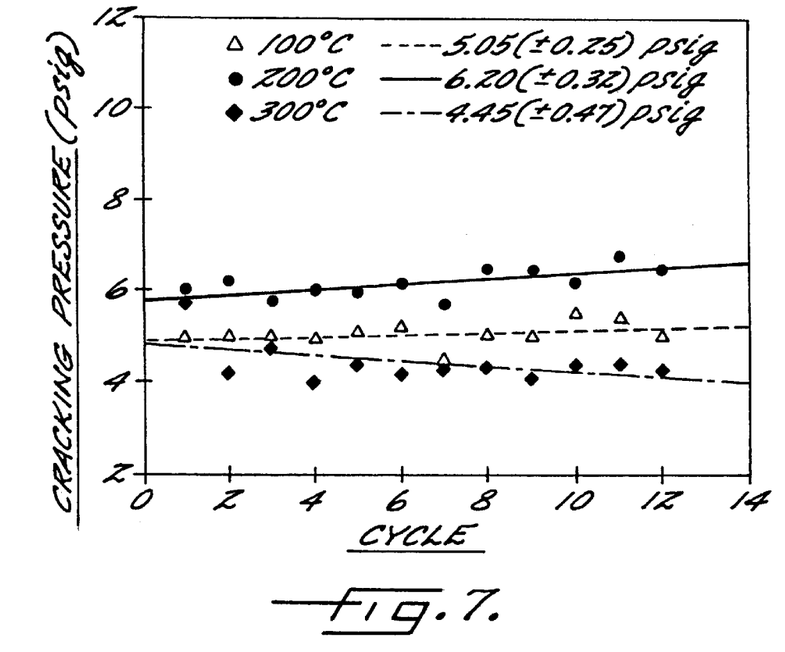
FIG. 7 is a plot of cracking pressure test data for a poppet check valve in accordance with an embodiment of the invention at temperatures of 100° C., 200° C., and 300° C.
Figure 8:
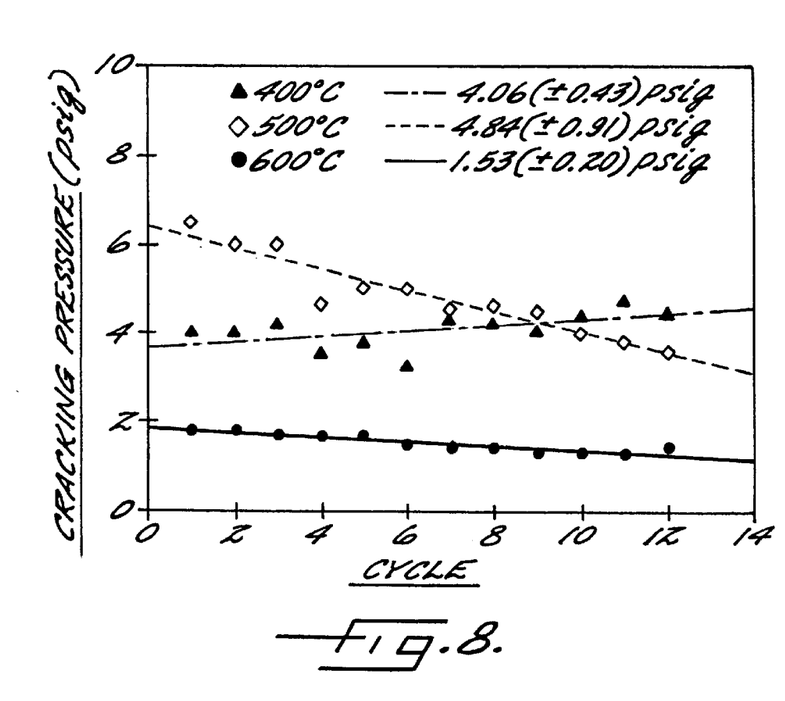
FIG. 8 is a plot of cracking pressure test data for a poppet check valve in accordance with an embodiment of the invention at temperatures of 400° C., 500° C., and 600° C.

The 12 cracking pressure measurements at each temperature are plotted in FIGS. 7 and 8. It is noted that the data do not show any discernable trend. It is believed this may be the result of deformations of the non-ceramic components of the valve; for instance, the skirt of the poppet may have flared on initial heating, which may explain the increase in cracking pressure from 2.4 psig at room temperature to 5.1 psig at 100° C. Previous studies on ceramics indicate that high temperatures up to 900° C. have little effect on the properties of ceramics, so it is believed the erratic cracking pressure measurements are attributable to changes in the stainless steel components of the valve caused by the high temperatures. This conclusion is supported by the fact that the cracking pressure dropped sharply between 500° C. and 600° C., and the tensile strength of the austenitic stainless steel from which the poppet and housing were made begins to drop rapidly above 500° C. It was also noted that the maximum pressure of the valve decreased from an average of about 17.4 psig at 500° C. to an average of about 11.9 psig at 600° C.; in contrast, from 100° C. up to 500° C. the maximum pressure dropped by only about 0.4 psig. Thus, there clearly was a substantial change in the valve above 500° C.

Figure 6:
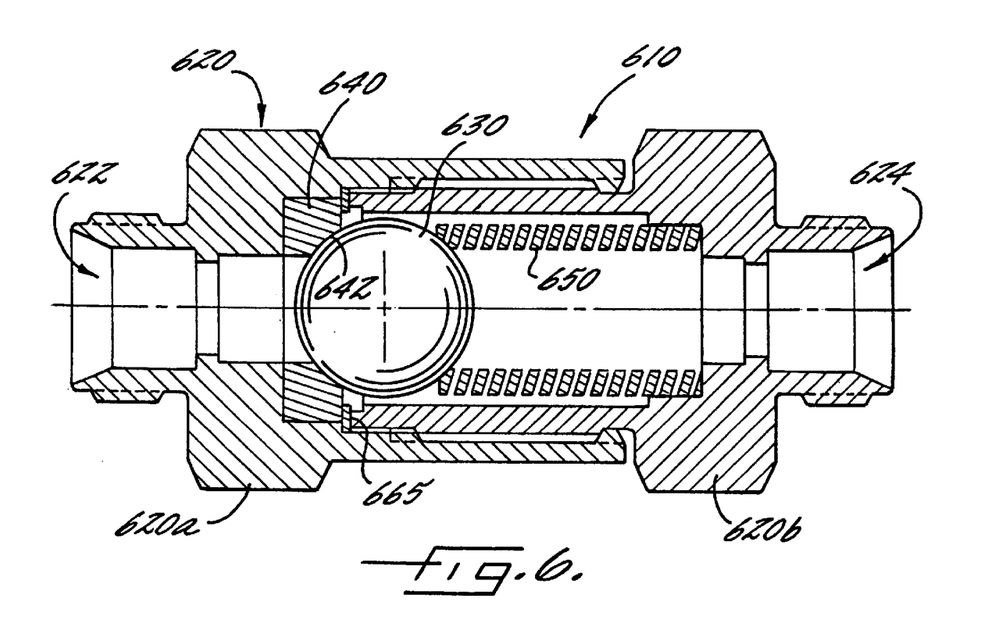
FIG. 6 is a cross-sectional view of a ball-type check valve in accordance with still another embodiment of the invention.

FIG. 6 depicts another embodiment of a check valve in accordance with the invention, in the form of a ball check valve 610. The check valve includes a housing 620 having a passage extending therethrough from an inlet 622 to an outlet 624 thereof. A valve ball 630 is disposed in the passage so as to be slidable relative to the housing in the longitudinal direction along which the passage extends. The valve ball 630 interacts with a seat 640 mounted in the housing so as to regulate flow through the valve 610. More particularly, the valve ball 630 is urged by a spring 650 into sealing engagement with a seating surface 642 of the seat 640. The seating surface 642 is preferably configured as a spherical surface having the same radius of curvature as the valve ball. Flow in the direction from the outlet 624 to the inlet 622 is prevented by the sealing engagement between the valve ball 630 and the seat 640. Fluid pressure differential across the valve ball 630 in this flow situation urges the valve ball 630 against the seat 640, and thus acts in the same direction as the force of the spring 650. However, when fluid flows in the opposite direction, from the inlet 622 to the outlet 624, the fluid pressure differential across the valve ball 630 acts against the force of the spring; accordingly, if the pressure differential becomes large enough to overcome the spring force, the valve ball 630 will be urged away from the seat 640, thus allowing fluid to flow. The "cracking pressure" that is required to open the valve in this manner can be varied by varying the spring constant for the spring 650.

In accordance with the present invention, at least the seat 640 and the spring 650 are formed of a refractory material, and at least the spring 650 is formed of a toughened refractory material that is capable of significant elongation and compression without failure, as previously described. Additionally, the valve ball 630 can also be formed of a refractory material. The seat 640 advantageously is firmly fixed in the housing 620, such as by adhesively bonding the seat to abutting surfaces of the housing.

The housing 620 is formed of a first portion 620a in which the seat 640 is mounted, and a second portion 620b that houses the valve ball 630 and spring 650. The first and second portions of the housing comprise tubular members, the second portion being received into the first portion and connected thereto by a threaded connection. The valve 610 preferably includes a seal 665 between the second portion 620b of the housing and the seat 640, which is compressed therebetween when the second portion is screwed into the first portion. The seal 665 advantageously comprises a non-polymer-based material such a graphite-impregnated foil (GRAFOIL). Variations on the ball check valve are possible. For example, a second seat can be disposed between the ball and the spring to provide a flat surface for engaging the spring.

A ball check valve with ceramic ball, ceramic seat, and ceramic spring in a stainless steel housing, generally as shown in FIG. 6, was manufactured and tested (at room temperature only) for cracking pressure in accordance with the procedure previously described. An average cracking pressure of about 1.5 psig was measured.

A prototype ball valve was also built in accordance with that of FIG. 1 but without the spring guards and high-temperature packing. The ceramic springs, seats and ball were all of ceramic. The prototype was tested (at room temperature only) following the procedures described above. The prototype valve retained a maximum differential pressure of 50 psig. The fact that the valve was not able to support higher differential pressure without leaking is attributed to the strength of the biasing springs. That is, at high differential pressure, the spring on the downstream side of the ball is not able to overcome the differential pressure and hence the seat biased by the downstream spring is moved away from the ball, thus compromising the seal between the ball and the seat. Higher maximum pressure differentials should be attainable by employing stiffer springs.

The tests of the poppet and ball check valves described above, and tests that have been conducted on other ceramic valves and ceramic valve components, indicate that the valves in accordance with the present invention are capable of operating at high temperatures of 600° C. or more. Ceramic springs as described herein have been successfully tested at 900° C., and it has been found that the spring constants remain essentially the same from room temperature up to this elevated temperature, suggesting that the ceramic components of the valves can easily withstand temperatures up to 1000° C.

Thus, embodiments of the invention are facilitated by the use of a flexible refractory material such as, for example, a ceramic that is fully annealed to minimize porosity and maximize homogeneity. In a particularly advantageous embodiment, the components described as being fabricatable from a refractory material are comprised of a ceramic such as, for example, yttria-stabilized zirconia that is fully annealed to substantially eliminate porosity and to produce a substantially homogeneous material, wherein the resulting material is capable of substantial elongation without failure. The characteristics of the fully annealed ceramic materials further facilitate the construction of valve components that are critical to the operation of the valve and/or are required to contact the fluid producing the hostile environment. These ceramic materials are generally capable of withstanding the extreme temperatures, corrosives, abrasives, and/or other hostile conditions created by the fluid flowing through the valve. Ease of fabrication of the valve components from the ceramic material facilitates a reduction in the number of separate components comprising the valve and allows for construction techniques resulting in unitary construction of single components or combinations of selected components, which may reduce the costs of valve production as well as possibly increasing the safety and reliability thereof. A valve having ceramic components according to embodiments of the invention therefore provides a relatively safe, reliable, and cost-efficient valve suitable for use in high temperature applications or other hostile environments caused by, for example, corrosive or abrasive fluid media for which common valves are unsuited.

Many modifications and other embodiments of the invention will come to mind to one skilled in the art to which this invention pertains having the benefit of the teachings presented in the foregoing descriptions and the associated drawings. For example, while the valves illustrated and described herein have a single inlet and single outlet, the invention is equally applicable to multi-port valves having a single inlet and multiple outlets, multiple inlets and a single outlet, or multiple inlets and multiple outlets; it is within the capabilities of one of ordinary skill in the art to construct such a multi-port valve based on the present disclosure. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of fabricating a sealing device for interacting with a flow-control element of a valve for controlling the flow of a fluid, said method comprising the steps of:

providing a cylinder of a toughened refractory material having a bore formed therethrough such that the bore defines an axis and is adapted to cooperate with the flow-control element to control the flow of a fluid through the bore;

forming a seating surface in the cylinder;

forming a circumferentially and axially extending channel in the cylinder opposing the seating surface, the channel extending into the cylinder concentrically with the bore and thereby forming a generally cylindrical spring blank radially outward of the channel and a generally cylindrical spring shield radially inward of the channel such that the bore is defined by an inner surface of the spring shield; and forming a spiral groove in the spring blank so as to fabricate a biasing device such that the seating surface, the spring shield, and the biasing device comprise an integral structure.

2. The method of claim 1, further comprising forming a groove in the cylinder proximate the seating surface so as to cause a portion of the cylinder defining a portion of the seating surface to be resiliently flexible relative to the remainder of the cylinder.

* * * * *